US008422672B2

(12) United States Patent
Ohkoshi et al.

(10) Patent No.: US 8,422,672 B2
(45) Date of Patent: Apr. 16, 2013

(54) AUTHENTICATED DEVICE, AUTHENTICATING DEVICE AND AUTHENTICATING METHOD

(75) Inventors: Takehiro Ohkoshi, Tokyo (JP); Sueko Ohkoshi, legal representative, Tokyo (JP); Keiki Yamada, Tokyo (JP); Satoru Makita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1448 days.

(21) Appl. No.: 10/584,194

(22) PCT Filed: Apr. 23, 2004

(86) PCT No.: PCT/JP2004/005881
§ 371 (c)(1),
(2), (4) Date: May 25, 2007

(87) PCT Pub. No.: WO2005/067199
PCT Pub. Date: Jul. 21, 2005

(65) Prior Publication Data
US 2007/0211892 A1    Sep. 13, 2007

(30) Foreign Application Priority Data

Dec. 26, 2003   (JP) .................................. 2003-432476

(51) Int. Cl.
*H04K 1/00* (2006.01)
(52) U.S. Cl.
USPC .......................................................... 380/30
(58) Field of Classification Search .................. None
See application file for complete search history.

(56) References Cited

U.S. PATENT DOCUMENTS

| 5,179,591 | A | 1/1993 | Hardy et al. |
| 5,537,474 | A | 7/1996 | Brown et al. |
| 5,668,875 | A | 9/1997 | Brown et al. |
| 5,987,128 | A | 11/1999 | Baba et al. |
| 5,987,129 | A | 11/1999 | Baba et al. |
| 6,182,215 | B1 | 1/2001 | Tatebayashi et al. |
| 6,304,192 | B1 | 10/2001 | Kawasaki et al. |
| 6,553,492 | B1 | 4/2003 | Hosoe |
| 2003/0097592 | A1 | 5/2003 | Adusumilli |
| 2004/0004958 | A1 | 1/2004 | Wang |
| 2004/0034771 | A1* | 2/2004 | Edgett et al. .................. 713/168 |

FOREIGN PATENT DOCUMENTS

| EP | 0 792 042 A2 | 8/1997 |
| EP | 1 035 684 A2 | 9/2000 |
| JP | 5-227152 A | 9/1993 |
| JP | 9-83509 A | 3/1997 |

(Continued)

*Primary Examiner* — Kaveh Abrishamkar
(74) *Attorney, Agent, or Firm* — Birch, Stewart, Kolasch & Birch, LLP

(57) ABSTRACT

An authenticated device 200 includes a memory unit 220 to store at least one algorithm identifier and at least one encryption key identifier, a transmitting unit 212 to transmit at least one algorithm identifier and at least one encryption key identifier stored by the memory unit 220 to an authenticating device 100, a receiving unit 211 to receive a prescribed algorithm identifier and a prescribed encryption key identifier selected from among at least one algorithm identifier and at least one encryption key identifier transmitted by the transmitting unit 212 from the authenticating device 100, and an authentication processing unit 296 to perform an authentication process with the authenticating device 100 based on the prescribed algorithm identifier and the prescribed encryption key identifier received by the receiving unit 211.

10 Claims, 11 Drawing Sheets

FOREIGN PATENT DOCUMENTS

| | | |
|---|---|---|
| JP | 10-304333 A | 11/1998 |
| JP | 11-274999 A | 10/1999 |
| JP | 11-328460 A | 11/1999 |
| JP | 11-339080 A | 12/1999 |
| JP | 2000-151578 A | 5/2000 |
| JP | 2000-261427 A | 9/2000 |
| JP | 2000-293717 A | 10/2000 |
| JP | 2003-198530 A | 7/2003 |
| TW | 566030 | 12/2003 |
| TW | 200307439 | 12/2003 |
| WO | WO-96/05702 A2 | 9/1996 |
| WO | WO-03/088558 A1 | 10/2003 |

* cited by examiner

AUTHENTICATED DEVICE, AUTHENTICATING DEVICE AND AUTHENTICATING METHOD

TECHNICAL FIELD

The present invention relates to an authenticated device or an authenticating device. Alternatively, the present invention relates to an authenticating method for performing an authentication between the authenticating device and the authenticated device.

BACKGROUND ART

When a user enjoys a certain service, identification (authentication) is performed to identify whether the user is a valid user qualified to enjoy the service, and key sharing is performed for cryptographic communication. One type of cryptographic algorithm is used in cryptographic communication, and authentication and key sharing cannot be performed between devices implementing different algorithms.

Further, there is a reference describing a communication system wherein a plurality of protocols for cryptographic technology application can be employed (JP10-304333).

Additionally, there are references describing technologies utilizing a plurality of algorithms (JP2000-151578, JP5-227152).

As stated above, conventionally, one kind of cryptographic algorithm has been used in cryptographic communication, therefore, when the algorithm is found to be vulnerable or is broken, or when security (safety) with data encryption cannot be held due to leakage of keys or the like, a securer algorithm etc. is to be implemented. In such a case, it may happen that different algorithms are implemented by devices, and there has been a problem in that authentication and key sharing cannot be performed between such devices implementing different algorithms, as referred to above. Also, since different cryptographic algorithms are provided by each manufacturer or the like for a market etc., there has been a problem in that authentication and key sharing cannot be performed between devices implementing such different algorithms.

Moreover, there has been a problem in that when the security (safety) is not being maintained any more, a securer algorithm is to be implemented as mentioned above, which may result in a case where the existent systems and devices become unusable by implementing a new algorithm etc.

Additionally, there has been a problem in that even if a more sophisticated algorithm is to be devised in the future, the algorithm cannot be applied to the device which has been used.

It is an object of the present invention to resolve problems such as impossibility to perform the authentication due to difference of installed algorithms.

It is another object of the present invention to allow a system and a device to remain operable even when an algorithm has been made unusable due to breaking of the algorithm or the like.

Further, it is another object of the present invention to reduce the risk of decrease in security due to breaking of the algorithm or the like, by allowing a system and a device to remain workable.

Additionally, it is another object of the present invention to reduce the chances of invalid decryption being performed by eavesdropping etc., and to improve the security.

DISCLOSURE OF THE INVENTION

There is provided according to one aspect of the present invention an authenticated device including:

a memory unit to store at least one algorithm identifier and at least one encryption key identifier;

a transmitting unit to transmit the at least one algorithm identifier and the at least one encryption key identifier stored by the memory unit to an authenticating device;

a receiving unit to receive from the authenticating device a prescribed algorithm identifier and a prescribed encryption key identifier, selected from among the at least one algorithm identifier and the at least one encryption key identifier transmitted by the transmitting unit; and an authentication processing unit to perform an authentication process with the authenticating device, based on the prescribed algorithm identifier and the prescribed encryption key identifier received by the receiving unit.

Further, the memory unit stores at least one algorithm identifier and at least one encryption key identifier in such a manner that one algorithm identifier and one encryption key identifier are paired as one profile;

the transmitting unit transmits, to the authenticating device, the at least one algorithm identifier and the at least one encryption key identifier stored by the memory unit in such a manner that one algorithm identifier and one encryption key identifier are paired as one profile;

the receiving unit receives, from the authenticating device, the prescribed algorithm identifier and the prescribed encryption key identifier paired as a prescribed profile, among the at least one algorithm identifier and the at least one encryption key identifier transmitted by the transmitting unit; and the authentication processing unit performs the authentication process with the authenticating device, based on the prescribed algorithm identifier and the prescribed encryption key identifier paired as the prescribed profile received by the receiving unit.

Additionally, the memory unit further stores a version identifier to identify a version indicating a set in such a manner that one set is formed from at least one algorithm corresponding to the at least one algorithm identifier stored; the transmitting unit further transmits the version identifier stored by the memory unit to the authenticating device;

the receiving unit further receives, from the authenticating device, the prescribed algorithm identifier corresponding to a prescribed algorithm among the at least one algorithm forming the set indicated by the version identified by the version identifier transmitted from the transmitting unit; and the authentication processing unit further performs the authentication process with the authenticating device, based on the prescribed algorithm identifier received by the receiving unit and on a prescribed encryption key identifier paired with the prescribed algorithm identifier.

Furthermore, there is provided another aspect of the present invention an authenticating device including:

a memory unit to store at least one algorithm identifier and at least one encryption key identifier;

a receiving unit to receive at least one algorithm identifier and at least one encryption key identifier from an authenticated device;

a selecting unit to select a prescribed algorithm identifier and a prescribed encryption key identifier to be stored by the memory unit from among the at least one algorithm identifier and the at least one encryption key identifier received by the receiving unit, when the at least one algorithm identifier and the at least one encryption key identifier stored by the memory unit exist among the at least one algorithm identifier and the at least one encryption key identifier received by the receiving unit;

a transmitting unit to transmit the prescribed algorithm identifier and the prescribed encryption key identifier selected by the selecting unit to the authenticated device; and an authentication processing unit to perform an authentication process with the authenticated device, based on the prescribed algorithm identifier and the prescribed encryption key identifier transmitted by the transmitting unit.

Further, the memory unit stores at least one profile identifier to identify at least one profile, whereby one algorithm identifier among the at least one algorithm identifier and one encryption key identifier among the at least one encryption key identifier are paired;

the receiving unit receives at least one profile identifier from the authenticated device;

the selecting unit selects a prescribed profile identifier to be stored by the memory unit from among the at least one profile identifier received by the receiving unit, when the at least one profile identifier stored by the memory unit exists among the at least one profile identifier received by the receiving unit;

the transmitting unit transmits the prescribed profile identifier selected by the selecting unit to the authenticated device; and the authentication processing unit performs the authentication process with the authenticated device, based on the prescribed algorithm identifier and the prescribed encryption key identifier paired by a prescribed profile identified by the prescribed profile identifier transmitted by the transmitting unit.

Additionally, the memory unit further stores a version identifier to identify a version of a set in such a manner that one set is formed from at least one algorithm corresponding to the at least one algorithm identifier stored;

the receiving unit receives a prescribed version identifier from the authenticated device;

the selecting unit further selects the prescribed algorithm identifier corresponding to one algorithm in the set indicated by the version identified by the prescribed version identifier received by the receiving unit;

the transmitting unit further transmits the prescribed algorithm identifier selected by the selecting unit to the authenticated device; and the authentication processing unit further performs the authentication process with the authenticated device, based on the prescribed algorithm identifier transmitted by the transmitting unit and on a prescribed encryption key identifier paired with the prescribed algorithm identifier.

Furthermore, there is provided according to another aspect of the invention an authenticating method including:

a first transmitting step to transmit, from an authenticated device storing a plurality of algorithm identifiers and a plurality of encryption key identifiers, to an authenticating device, the plurality of algorithm identifiers and the plurality of encryption key identifiers stored;

a first receiving step to receive the plurality of algorithm identifiers and the plurality of encryption key identifiers transmitted from the authenticated device by the first transmitting step, at the authenticating device storing at least one algorithm identifier and at least one encryption key identifier;

a selecting step to select, at the authenticating device, a prescribed algorithm identifier and a prescribed encryption key identifier to be stored by the authenticating device from among the plurality of algorithm identifiers and the plurality of encryption key identifiers received by the receiving step, when the at least one algorithm identifier and the at least one encryption key identifier stored by the authenticating device exist among the plurality of algorithm identifiers and the plurality of encryption key identifiers received by the first receiving step;

a second transmitting step to transmit the prescribed algorithm identifier and the prescribed encryption key identifier selected by the selecting step, from the authenticating device to the authenticated device;

a second receiving step to receive the prescribed algorithm identifier and the prescribed encryption key identifier transmitted by the second transmitting step, from the authenticating device, at the authenticated device; and an authentication processing step to perform an authentication process between the authenticating device and the authenticated device, based on the prescribed algorithm identifier and the prescribed encryption key identifier received by the second receiving step.

Additionally, there is provided according to another aspect of the present invention an authenticating method including:

a first transmitting step to transmit, from an authenticated device storing at least one algorithm identifier and at least one encryption key identifier, to an authenticating device, the at least one algorithm identifier and the at least one encryption key identifier stored;

a first receiving step to receive the at least one algorithm identifier and the at least one encryption key identifier transmitted from the authenticated device by the first transmitting step, at the authenticating device storing a plurality of algorithm identifiers and a plurality of encryption key identifiers;

a selecting step to select, at the authenticating device, a prescribed algorithm identifier and a prescribed encryption key identifier to be stored by the authenticating device from among the at least one algorithm identifier and the at least one encryption key identifier received by the receiving step, when at least one of the plurality of algorithm identifiers and at least one of the plurality of encryption key identifiers stored by the authenticating device exist among the at least one algorithm identifier and the at least one encryption key identifier received by the first receiving step;

a second transmitting step to transmit the prescribed algorithm identifier and the prescribed encryption key identifier selected by the selecting step, from the authenticating device to the authenticated device; a second receiving step to receive the prescribed algorithm identifier and the prescribed encryption key identifier transmitted by the second transmitting step, from the authenticating device, at the authenticated device; and an authentication processing step to perform an authentication process between the authenticating device and the authenticated device, based on the prescribed algorithm identifier and the prescribed encryption key identifier received by the second receiving step.

PREFERRED EMBODIMENTS FOR CARRYING OUT THE INVENTION

Embodiment 1

Figure 1:
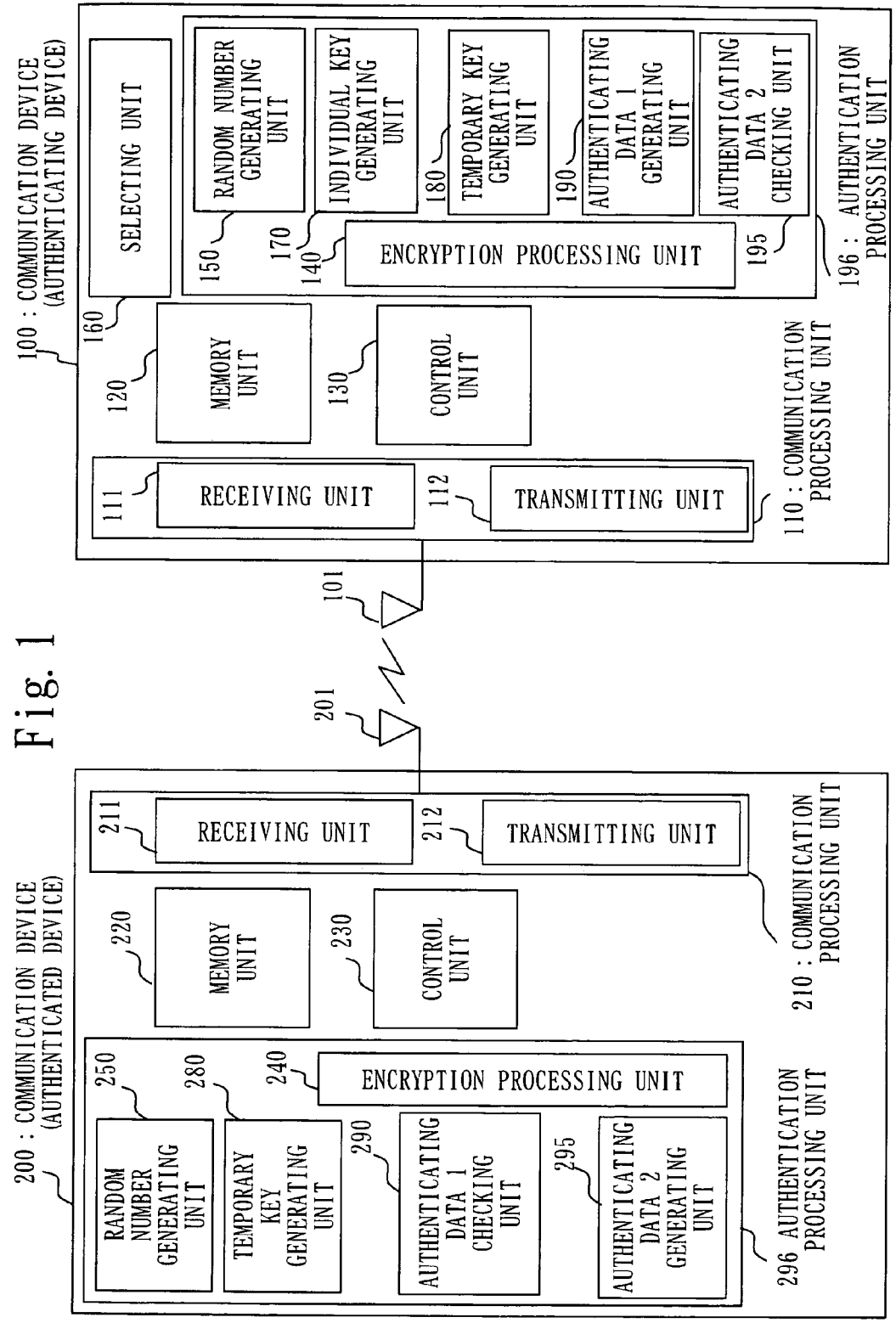
FIG. 1 is a diagram describing a structure of an authentication system according to a first embodiment.

FIG. 1 is a diagram describing a structure of an authentication system according to the first embodiment. In FIG. 1, the authentication system includes a communication device 100 as an authenticating device and a communication device 200 as an authenticated device. The communication device 100 includes an antenna 101, a communication processing unit 110, a memory unit 120, a control unit 130, a selecting unit 160 and an authentication processing unit 196. The communication processing unit 110 includes a receiving unit 111 and a transmitting unit 112. The authentication processing unit 196 includes an encryption processing unit 140, a random number generating unit 150, an individual key generating unit 170, a temporary key generating unit 180, an authenticating data 1 generating unit 190 and an authenticating data 2 checking unit 195. The communication device 200 includes an antenna 201, a communication processing unit 210, a memory unit 220, a control unit 230 and an authentication processing unit 296. The communication processing unit 210 includes a receiving unit 211 and a transmitting unit 212. The authentication processing unit 296 includes an encryption processing unit 240, a random number generating unit 250, a temporary key generating unit 280, an authenticating data 1 checking unit 290 and an authenticating data 2 generating unit 295. The first embodiment describes a case wherein wireless communication is performed between the communication device 100 and the communication device 200 via the antennas 101 and 201. However, it is not restricted to wireless communication, and wire communication can be performed instead. For example, it is possible to configure the communication device 100 as a roadside device at a store side, and the communication device 200 as an on-board device at a vehicle side in ETC (Electronic Toll Collection) or drive-through etc.

Figure 2:
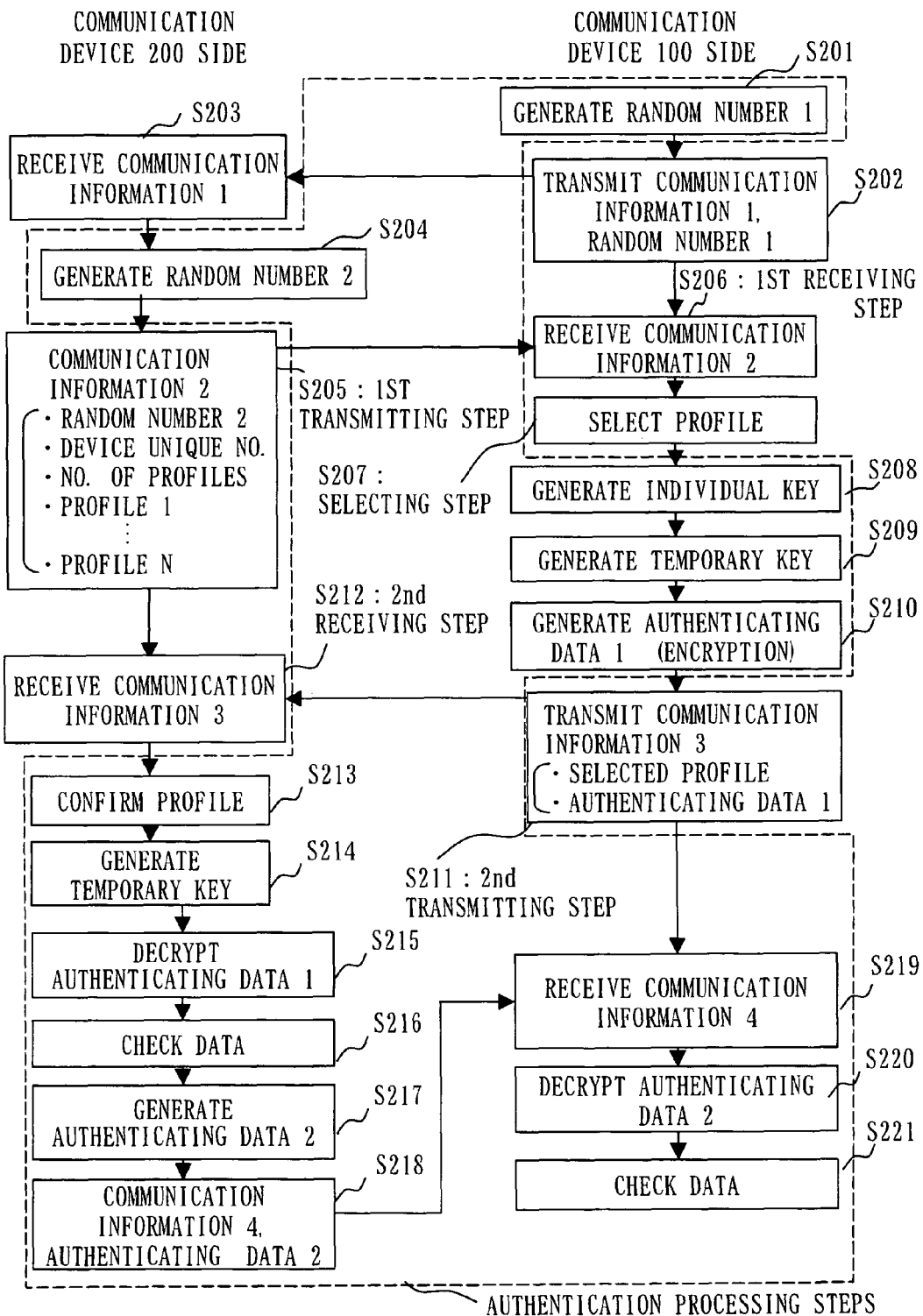
FIG. 2 is a flowchart describing an authenticating method according to the first embodiment.

FIG. 2 is a flowchart describing the authenticating method according to the first embodiment.

The memory unit 120 stores at least one algorithm identifier, at least one encryption key identifier and algorithms corresponding to each algorithm identifier of at least one algorithm identifier. Further, the memory unit 120 stores at least one profile identifier to identify at least one profile whereby one algorithm identifier of at least one algorithm identifier and one encryption key identifier of at least one encryption key identifier are paired with each other.

The memory unit 220 stores at least one algorithm identifier, at least one encryption key identifier, algorithms corresponding to each algorithm identifier of at least one algorithm identifier, individual keys unique to devices as encryption keys corresponding to each encryption key identifier of at least one encryption key identifier, and a device unique number. Further, the memory unit 220 stores at least one algorithm identifier and at least one encryption key identifier in such a manner that one algorithm identifier and one encryption key identifier are paired as one profile, and at least one profile identifier to identify profiles.

It is only necessary that at least one of the communication devices 100 and 200 contains a plurality of pairs of one algorithm identifier and one encryption key identifier.

In S201 (Step 201) as a part of authentication processing steps, the random number generating unit 150 generates a random number 1.

In S202 (Step 202), as a transmitting step, the transmitting unit 112 transmits the random number 1 generated by the random number generating unit 150 as communication information 1 to the communication device 200. For example, when a vehicle equipped with the communication device 200 is detected by the communication device 100 with a detecting unit not shown in the figures, the transmitting unit 112 transmits the random number 1 to the communication device 200. The communication device 100 requests key information (a key identifier and an algorithm identifier) held by the communication device 200 by transmitting the random number 1 as the communication information 1 to the communication device 200. In other words, the communication information 1 is request information to the communication device 200.

In S203, as a receiving step, the receiving unit 211 receives the random number 1 as the communication information 1 transmitted by the transmitting unit 112. The communication device 200 determines that the key information (the key identifier and the algorithm identifier) held by the communication device 200 is requested by the communication device 100 by receiving the random number 1 at the receiving unit 211.

In S204, as a part of the authentication processing steps, the random number generating unit 250 generates a random number 2.

In S205, as a transmitting step (a first transmitting step), the transmitting unit 212 transmits as communication information 2, at least one algorithm identifier, at least one encryption key identifier and the device unique number stored by the memory unit 220, and the random number 2 generated by the random number generation unit 250 to the communication device 200 as the authenticating device. Now, one algorithm identifier and one encryption key identifier are paired as a set represented as a profile. The communication information 2 contains data of the random number 2, the device unique number, the number of the profiles which is the same number as the sets of one algorithm identifier and one encryption key identifier, profile identifiers of the same number as the number of the profiles, and the algorithm identifiers and the encryption key identifiers paired as the profiles identified by each of the profile identifiers. Further, each of the profile identifiers, the algorithm identifiers and the encryption key identifiers paired as the profiles identified by each of the profile identifiers are such data that the identifiers are mutually correspondent. In sum, the transmitting unit 212 transmits to the communication device 100 as the authenticating device, at least one algorithm identifier and at least one encryption key identifier stored by the memory unit 220 in such a manner that one algorithm identifier and one encryption key identifier are paired as one profile.

In S206, as a receiving step (a first receiving step), the receiving unit 111 receives, from the communication device 200 as the authenticated device, the communication information 2 containing the random number 2, the device unique number, the number of the profiles which is the same number as the sets, at least one profile identifier of the same number as the number of the profiles, and at least one algorithm identifier and at least one encryption key identifier corresponding to each of the profile identifiers of at least one profile identifier.

In S207, as a selecting step, when at least one algorithm identifier and at least one encryption key identifier stored by the memory unit 120 exist among at least one algorithm identifier and at least one encryption key identifier received by the receiving unit 111, the selecting unit 160 selects a prescribed algorithm identifier and a prescribed encryption key identifier to be stored by the memory unit 120 from among at least one algorithm identifier and at least one encryption key identifier received by the receiving unit 111. In other words, when at least one profile identifier stored by the memory unit 120 exists among at least one profile identifier received by the receiving unit 111, the selecting unit 160 selects a prescribed profile identifier to be stored by the memory unit 120 from among at least one profile identifier received by the receiving unit 111. By selecting the prescribed profile identifier, the prescribed algorithm identifier and the prescribed encryption key identifier paired as a profile identified by the prescribed profile identifier are selected. It may be possible, for example, to simply select the algorithm identifier and the encryption key identifier commonly owned by both the communication devices 100 and 200, or to select the algorithm identifier and the encryption key identifier commonly owned by both the communication devices 100 and 200 after having deleted the algorithm identifier and the encryption key identifier whose security has become insufficient due to code-breaking etc. In the first embodiment, again, the algorithm identifier and the encryption key identifier corresponding to the prescribed profile identifier are selected by selecting the prescribed profile identifier.

In S208 as a part of the authentication processing steps, the individual key generating unit 170 generates an individual key held by the communication device 200 as an encryption key corresponding to the prescribed encryption key identifier selected by the selecting unit 160, based on the device unique number in the communication information 2 by using a hash value, for example.

In S209 as a part of the authentication processing steps, the temporary key generating unit 180, by using an algorithm corresponding to the prescribed algorithm identifier selected by the selecting unit 160, encrypts the random numbers 1 and 2 with the individual key generated by the individual key generating unit 170 as the encryption key corresponding to the prescribed encryption key identifier, by means of the encryption processing unit 140, and generates a temporary key as one example of an encryption key for authentication process.

In S210, as a part of the authentication processing steps, the authenticating data 1 generating unit 190 generates authenticating data 1 by encrypting the whole or part of the random number 2 with the temporary key generated by the temporary key generating unit 180, by means of the encryption processing unit 140.

In S211, as a transmitting step (a second transmitting step), the transmitting unit 112 transmits, as communication information 3, the prescribed algorithm identifier and the prescribed encryption key identifier selected by the selecting unit 160, the corresponding prescribed profile identifier selected by the selecting unit, and the authenticating data 1 generated by the authenticating data 1 generating unit 190, to the communication device 200 as the authenticated device.

In S212, the receiving unit 211 receives, as the communication information 3, the prescribed algorithm identifier, the prescribed encryption key identifier selected from among at least one algorithm identifier and at least one encryption key identifier, the profile identifier corresponding to the prescribed algorithm identifier and the prescribed encryption key identifier, and the authenticating data 1, transmitted by the transmitting unit 212 from the communication device 100 as the authenticating device. In other words, the receiving unit 211 receives the prescribed algorithm identifier and the prescribed encryption key identifier paired as the prescribed profile from among at least one algorithm identifier and at least one encryption key identifier, transmitted by the transmitting unit 212 from the communication device 100 as the authenticating device.

In S213 as a part of the authentication processing steps, the encryption processing unit 240 confirms the profile identifier received by the receiving unit 211, and the prescribed encryption key identifier and the prescribed algorithm identifier corresponding to the profile identifier.

In S214, as a part of the authentication processing steps, the temporary key generating unit 280, by using an algorithm corresponding to the prescribed algorithm identifier received by the receiving unit 211 and confirmed by the encryption processing unit 240, encrypts the random numbers 1 and 2 with the individual key stored by the memory unit 220 by means of the encryption processing unit 240, and generates the temporary key as one example of an encryption key for authentication process. In this way, the communication devices 100 and 200 are able to share the same temporary keys. The individual key stored in the memory unit 220 is generated by a generating method equivalent to that in the individual key generating unit 170, and is stored in the memory unit 220 in advance by using some means such as an IC card. When the temporary keys are generated by the temporary key generating units 180 and 280, encryption is performed with the temporary keys in the present embodiment. Instead, decryption may be performed, since it is only necessary that the authenticating device and the authenticated device perform the same process.

In S215, as a part of the authentication processing steps, the authenticating data 1 checking unit 290 decrypts the encrypted authenticating data 1 received as the communication information 3 by the receiving unit 211 with the temporary key generated by the temporary key generating unit 280, by the means of the encryption processing unit 240.

In S216, as a part of the authentication processing steps, the authenticating data 1 checking unit 290 checks whether data of the decrypted authenticating data 1 is the whole or part of the random number 2 transmitted from the communication device 200 to the communication device 100. If the data of the decrypted authenticating data 1 is the whole or part of the random number 2, it is shown that the communication for the authentication process is performed properly with the communication device 100, not with a fraudulent attacker. That is to say, one direction of the authentication process between the communication device 100 and the communication device 200 is proved to be successful.

In S217, as a part of the authentication processing steps, the authenticating data 2 generating unit 295 generates authenticating data 2 by encrypting the whole or part of the random number 1 with the temporary key generated by the temporary key generating unit 280, by means of the encryption processing unit 240.

In S218, as a transmitting step of a part of the authentication processing steps, the transmitting unit 212 transmits the authenticating data 2 generated by the authenticating data 2 generating unit 295 as communication information 4 to the communication device 100.

In S219, as a receiving step of a part of the authentication processing steps, the receiving unit 111 receives the authenticating data 2 as the communication information 4 from the communication device 200.

In S220, as a part of the authentication processing steps, the authenticating data 2 checking unit 195 decrypts the encrypted authenticating data 2 received by the receiving unit 111 as the communication information 4, with the temporary key generated by the temporary key generating unit 180, by means of the encryption processing unit 140.

In S221, as a part of the authentication processing steps, the authenticating data 2 checking unit 195 checks whether data of the decrypted authenticating data 2 is the whole or part of the random number 1 transmitted from the communication device 100 to the communication device 200. When the decrypted authenticating data 2 is the whole or part of the random number 1, it is shown that the communication for the authentication process is performed properly with the communication device 200, not with a fraudulent attacker. That is to say, the other direction of the authentication process between the communication device 100 and the communication device 200 is proved to be successful.

As stated above, the authentication process between the communication device 100 and the communication device 200 is finished, and thereafter, the communication device 100 and the communication device 200 communicate with each other data encrypted with the temporary keys, thereby security of the data is ensured.

Figure 3:
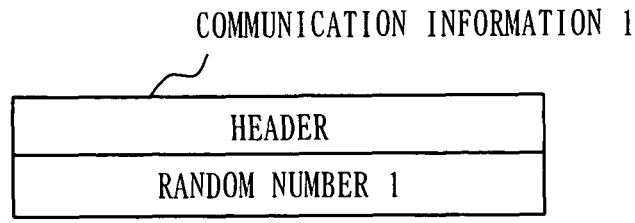
FIG. 3 is a diagram describing an example of a frame of communication information 1.

FIG. 3 is a diagram describing an example of a frame of the communication information 1.

In FIG. 3, the communication information 1 contains a header and data of the random number 1.

Figure 4:
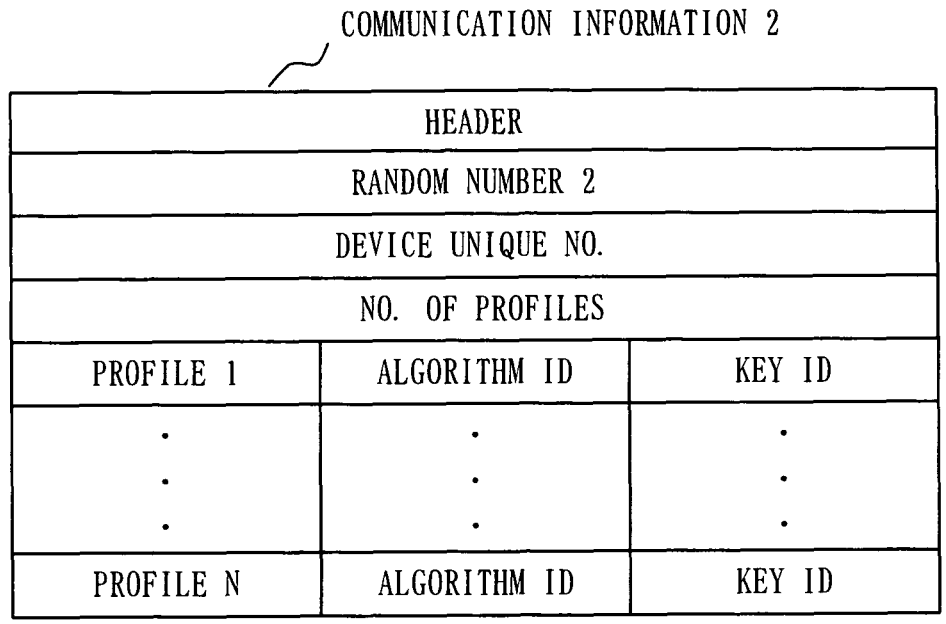
FIG. 4 is a diagram describing an example of a frame of communication information 2.

FIG. 4 is a diagram describing an example of a frame of the communication information 2.

In FIG. 4, the communication information 2 contains a header, data of the random number 2, the device unique number (device unique No.), the number of the profiles (No. of profiles), the profile identifiers such as Profile 1, ... Profile n to identify each of the profiles, and the algorithm identifiers (algorithm IDs) and the encryption key identifiers (key IDs) corresponding to each of the profile identifiers. In FIG. 4, the data is organized in such a manner that the correspondent relation among each of the profile identifiers, and the algorithm identifiers and the encryption key identifiers corresponding to each of the profile identifiers is recognizable.

Figure 5:
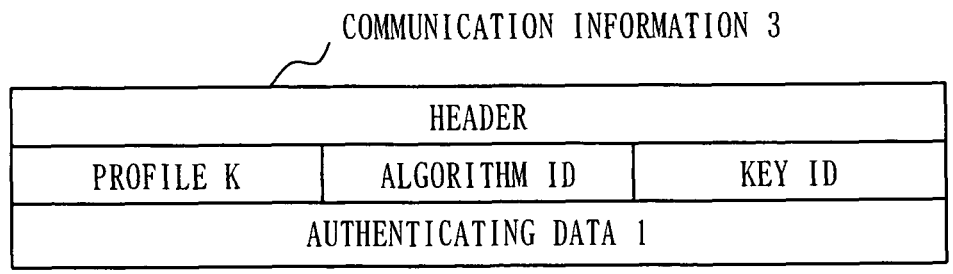
FIG. 5 is a diagram describing an example of a frame of communication information 3.

FIG. 5 is a diagram describing an example of a frame of the communication information 3.

In FIG. 5, the communication information 3 contains a header, Profile k as the prescribed profile identifier to identify the prescribed profile selected, the algorithm identifier (algorithm ID) and the encryption key identifier (key ID) corresponding to the prescribed profile identifier, and the authenticating data 1. In FIG. 5, the data is organized in such a manner that the corresponding relation among the prescribed profile identifier, the algorithm identifier and the encryption key identifier corresponding to the prescribed profile identifier is recognizable.

Figure 6:
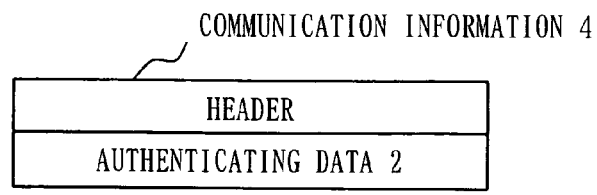
FIG. 6 is a diagram describing an example of a frame of communication information 4.

FIG. 6 is a diagram describing an example of a frame of the communication information 4.

In FIG. 6, the communication information 4 contains a header and the authenticating data 2.

Figure 7:
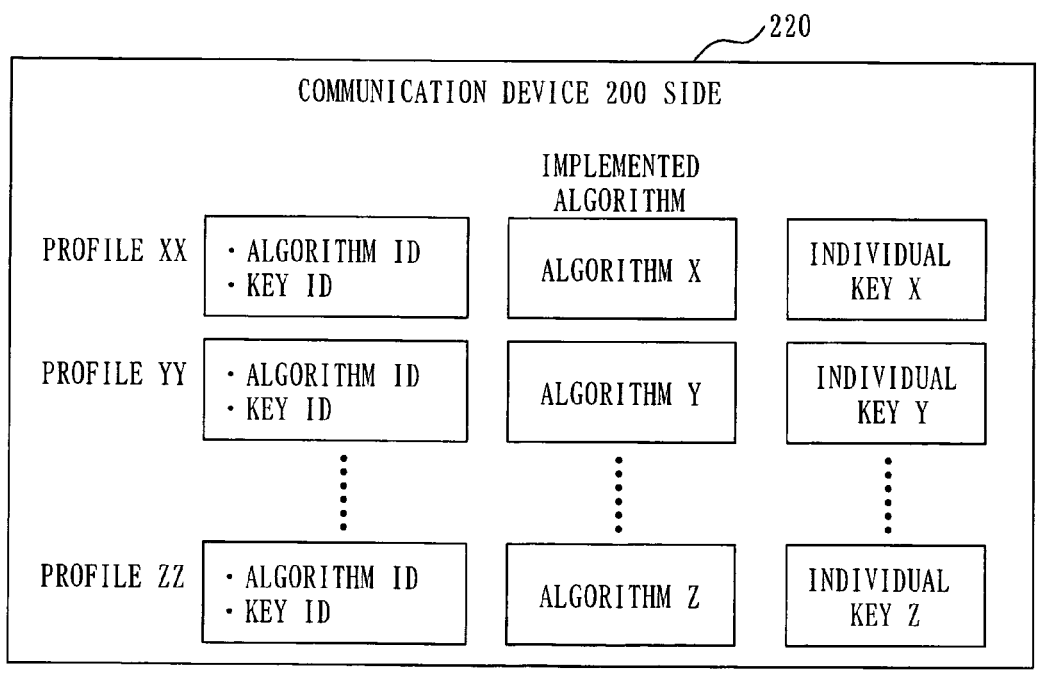
FIG. 7 is a diagram describing algorithm identifiers, encryption key identifiers, algorithms and individual keys installed on the communication device 200 side.

FIG. 7 is a diagram describing the algorithm identifiers, the encryption key identifiers, the algorithms and the individual keys installed on the communication device 200 side.

In FIG. 7, at the communication device 200 side, the memory unit 220 stores: an algorithm identifier (ID) and an encryption key identifier (ID) of a profile xx, an algorithm x corresponding to the algorithm identifier, and an individual key x corresponding to the encryption key identifier; an algorithm identifier and an encryption key identifier of a profile yy, an algorithm y corresponding to the algorithm identifier, and an individual key y corresponding to the encryption key identifier; ... and an algorithm identifier and an encryption key identifier of a profile zz, an algorithm z corresponding to the algorithm identifier, and an individual key z corresponding to the encryption key identifier. That is, they are installed (implemented) on the communication device 200.

Figure 8:
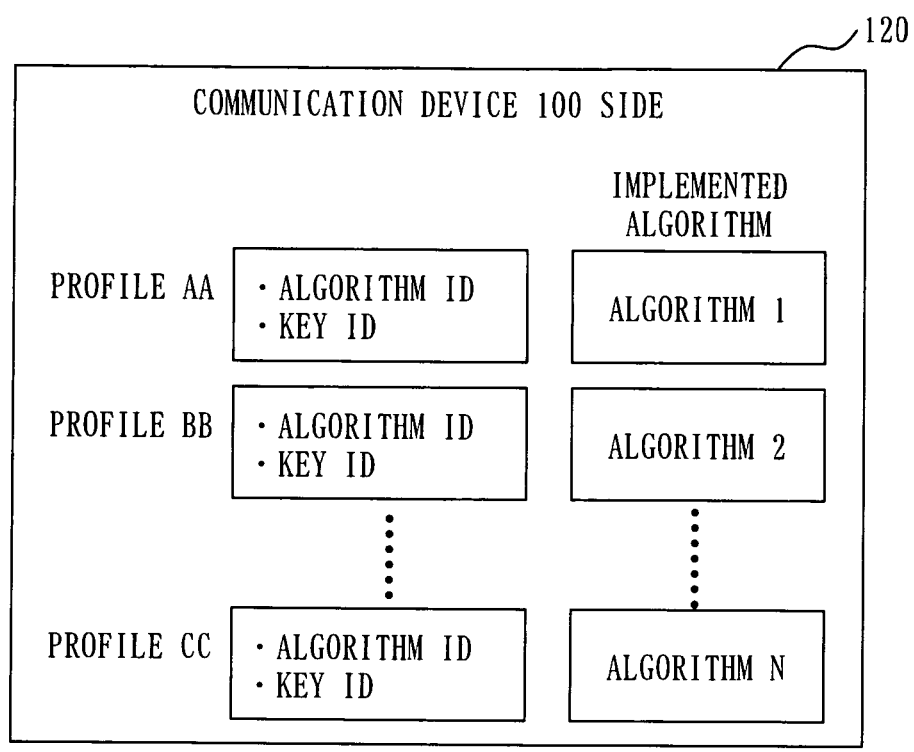
FIG. 8 is a diagram describing algorithm identifiers, encryption key identifiers, and algorithms installed on the communication device 100 side.

FIG. 8 is a diagram describing the algorithm identifiers, the encryption key identifiers and the algorithms installed on the communication device 100 side.

In FIG. 8, at the communication device 100 side, the memory unit 120 stores: an algorithm identifier (ID) and an encryption key identifier (ID) of a profile aa, and an algorithm 1 corresponding to the algorithm identifier; an algorithm identifier and an encryption key identifier of a profile bb, and an algorithm 2 corresponding to the algorithm identifier; ... and an algorithm identifier and an encryption key identifier of a profile cc, and an algorithm n corresponding to the algorithm identifier. That is, they are installed (implemented) on the communication device 100.

As stated above, the authentication processing unit 296 performs the authentication process with the communication device 100 as the authenticating device, based on the prescribed algorithm identifier and the prescribed encryption key identifier received by the receiving unit 211. More specifically, the authentication processing unit 296 generates the temporary key as the encryption key for authentication process by using the algorithm corresponding to the prescribed algorithm identifier received by the receiving unit 211 and the encryption key corresponding to the prescribed encryption key identifier received by the receiving unit, and performs the authentication process with the communication device 100 as the authenticating device by using the generated temporary key as the encryption key for authentication process. In other words, the authentication processing unit 296 generates the temporary key as the encryption key for authentication process, by using the algorithm corresponding to the prescribed algorithm identifier and the encryption key corresponding to the prescribed encryption key identifier received by the receiving unit 211, the prescribed algorithm identifier and the prescribed encryption key identifier being paired as the prescribed profile, and performs the authentication process with the authenticating device by using the generated temporary key as the encryption key for authentication process.

On the other hand, the authentication processing unit 196 performs the authentication process with the communication device 200 as the authenticated device, based on the prescribed algorithm identifier and the prescribed encryption key identifier transmitted by the transmitting unit 112. More specifically, the authentication processing unit 196 generates the temporary key as the encryption key for authentication process by using the algorithm corresponding to the prescribed algorithm identifier transmitted by the transmitting unit 112, and with the encryption key corresponding to the prescribed encryption key identifier transmitted by the transmitting unit 112, and performs the authentication process with the communication device 200 as the authenticated device by using the generated temporary key as the encryption key for authentication process. In other words, the authentication processing unit 196 generates the temporary key as the encryption key for authentication process, by using the algorithm corresponding to the prescribed algorithm identifier and the encryption key corresponding to the prescribed encryption key identifier transmitted by the transmitting unit 112, the prescribed algorithm identifier and the prescribed encryption key identifier being paired as the prescribed profile identified by the prescribed profile identifier, and performs the authentication process with the authenticated device by using the generated temporary key as the encryption key for authentication process.

The control unit 130 controls each unit of the communication device 100. The control unit 230 in turn controls each unit of the communication device 200. The memory unit 120 stores data generated in the process performed in each unit of the communication device 100. The memory unit 220 in turn stores data generated in the process performed in each unit of the communication device 200.

When the communication device 100 is configured as a roadside device at a store side, and the communication device 200 as an on-board device at a vehicle side in ETC, drive-through etc., for example, the above-mentioned steps are recapitulated as follows.

First, the roadside device at the store requests to the on-board device key information (a key identifier and an algorithm identifier) held by the on-board device.

Then, the on-board device transmits all the information concerning the key held by itself to the roadside device.

Next, the roadside device selects from among the key information received the key information coincides with the algorithm identifier and the key identifier held by itself, and notifies the on-board device of the algorithm identifier and the key identifier selected.

Thereafter, the roadside device and the on-board device perform the authentication and the key sharing by using common keys corresponding to the algorithm identifier and the key identifier commonly owned with each other.

As stated above, the first embodiment handles a plurality of algorithms used for cryptographic communication, and enables the system to remain operable even when an algorithm is made unusable due to breaking or the like by using another algorithm, and to reduce the risk of decrease in security due to breaking of the algorithm and the like. Additionally, the first embodiment makes it possible to reduce the number of times an identical algorithm is used by fully utilizing a plurality of the algorithms, therefore, it is enabled to reduce the chances of breaking the algorithm by unauthorized attacker, and to improve the security. Further, a newly devised algorithm can be installed on the communication devices, therefore, it is possible to facilitate application of the newly devised algorithm. When at least one of the communication devices 100 and 200 contains a plurality of the sets of one algorithm identifier and one key identifier, options are available, therefore such an effect mentioned above can be achieved. Meanwhile, in the first embodiment, it is only necessary that at least one of the devices 100 and 200 contains a plurality of the sets of one algorithm identifier and one encryption key identifier. However, according to the present invention, the authentication can be performed when at least one set of one algorithm identifier and one encryption key identifier of each device coincides with each other. Therefore, a plurality of the sets need not be contained in at least one of the devices 100 and 200, and only one set may be contained in each device. Further, since each device may contain only one set, the authenticating method according to the present invention can be applied to the conventional art wherein only one encryption algorithm is used.

Embodiment 2

Figure 9:
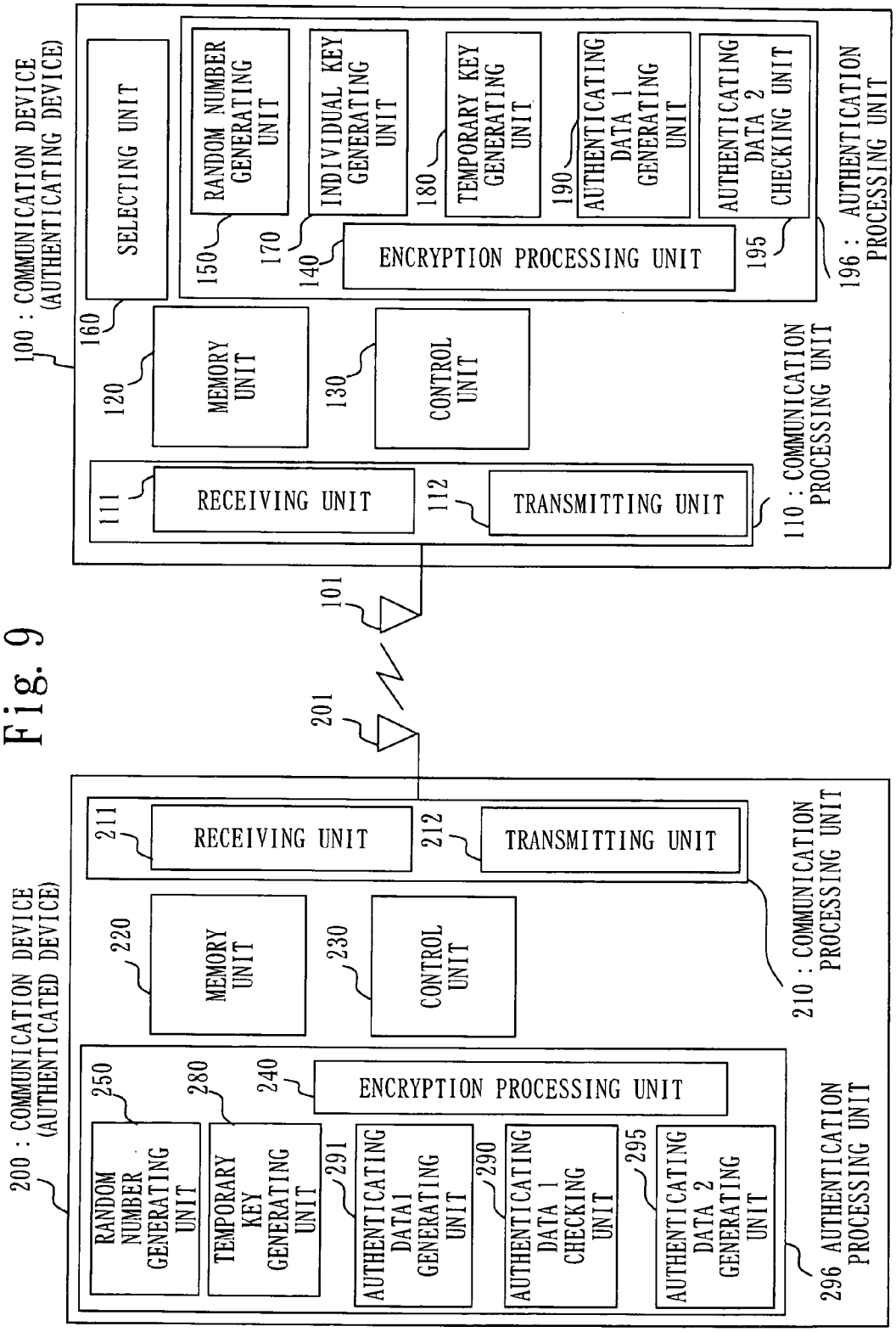
FIG. 9 is a diagram describing a structure of an authentication system according to a second embodiment.

FIG. 9 is a diagram describing a structure of an authentication system according to the second embodiment.

In FIG. 9, the authentication processing unit 296 in the communication device 200 includes an authenticating data 1 generating unit 291 further to the configuration described in FIG. 1. Each of the other parts of the configuration is the same as in FIG. 1.

Figure 10:
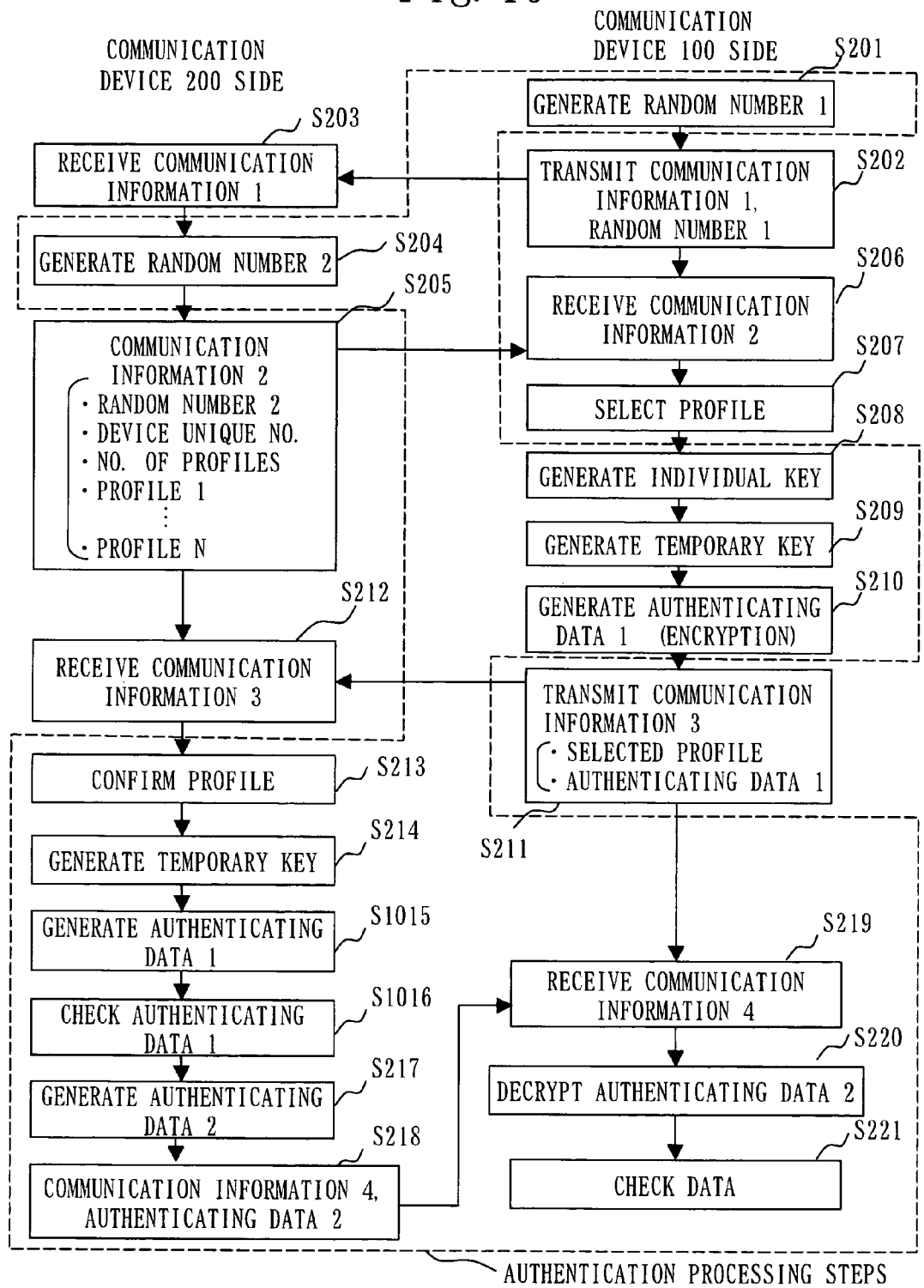
FIG. 10 is a flowchart describing an authenticating method according to the second embodiment.

FIG. 10 is a flowchart describing an authenticating method according to the second embodiment.

FIG. 10 is the same as FIG. 2 except that S215 and S216 of FIG. 2 are each replaced with S1015 and S1016.

In S1015 as a part of the authentication processing steps, the authenticating data 1 generating unit 291 generates the authenticating data 1 by encrypting the whole or part of the random number 2 with the temporary key generated by the temporary key generating unit 280 by means of the encryption processing unit 240.

In S1016 as a part of the authentication processing steps, the authenticating data 1 checking unit 290 checks whether the encrypted authenticating data 1 received as the communication information 3 by the receiving unit 211, and the authenticating data 1 generated by the authenticating data 1 generating unit 291 coincide with each other. If they coincide with each other, it is shown that the communication for authentication process is performed properly with the communication device 100, not with a fraudulent attacker. That is to say, one direction of the authentication process between the communication devices 100 and 200 is proved to be successful.

By the configuration as stated above, the effect similar to that in the first embodiment can be achieved.

Embodiment 3

Each part of the configuration according to the third embodiment is similar to that of FIG. 1.

Figure 11:
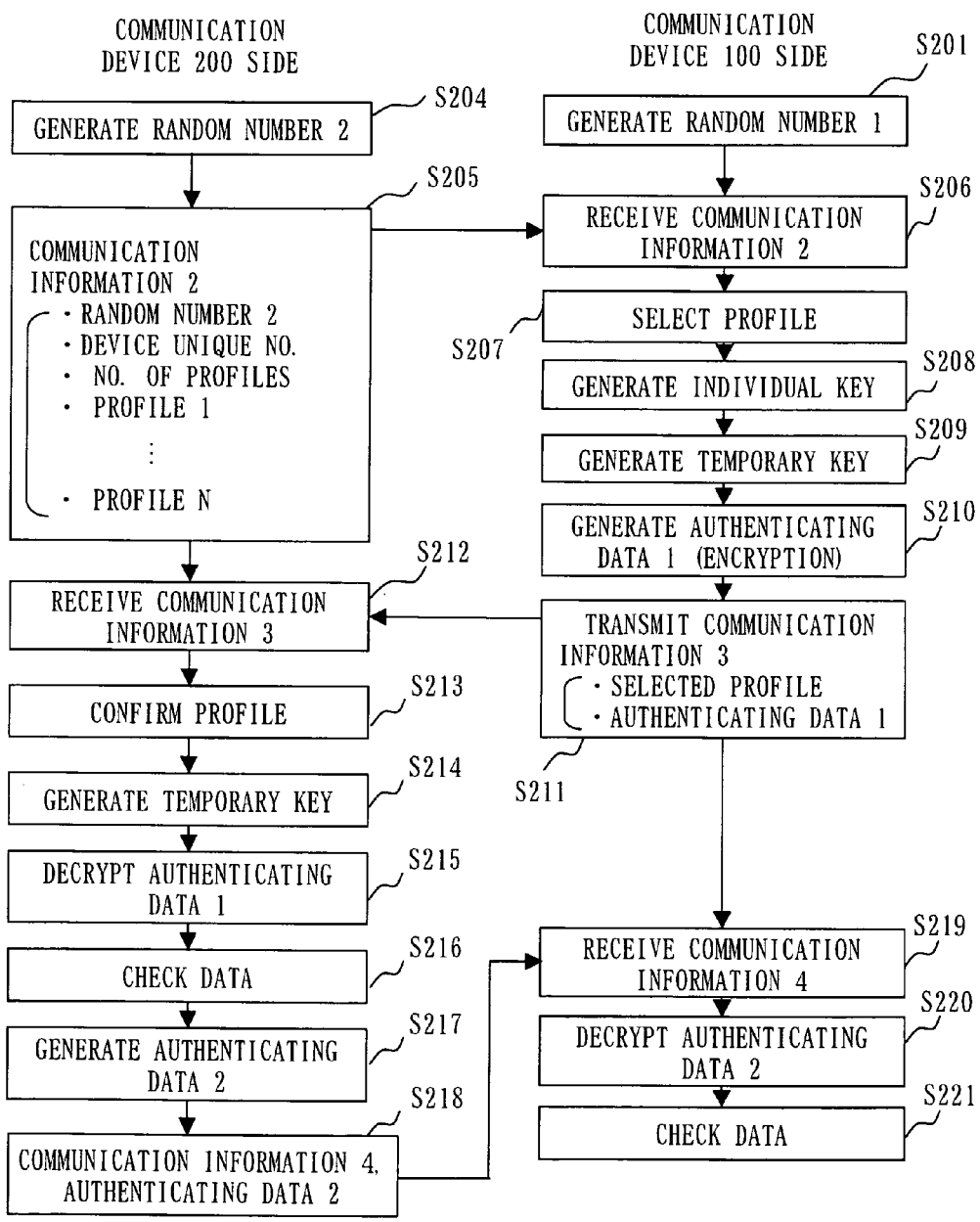
FIG. 11 is a flowchart describing an authenticating method according to a third embodiment.

FIG. 11 is a flowchart describing the authenticating method according to the third embodiment.

FIG. 11 is similar to FIG. 2 except that S202 and S203 of FIG. 2 do not exist in FIG. 11.

In the third embodiment, the configuration is such that the communication device 200 transmits the communication information 2 to the communication device 100 as the authenticating side, even when the communication device 100 has not transmitted the communication information 1 to the communication device 200. By omitting such steps, authentication flow can be performed at a faster pace.

By the configuration as stated above, the effect similar to that in the first embodiment can be achieved.

Embodiment 4

Each part of the configuration according to the fourth embodiment is similar to FIG. 1.

Figure 12:
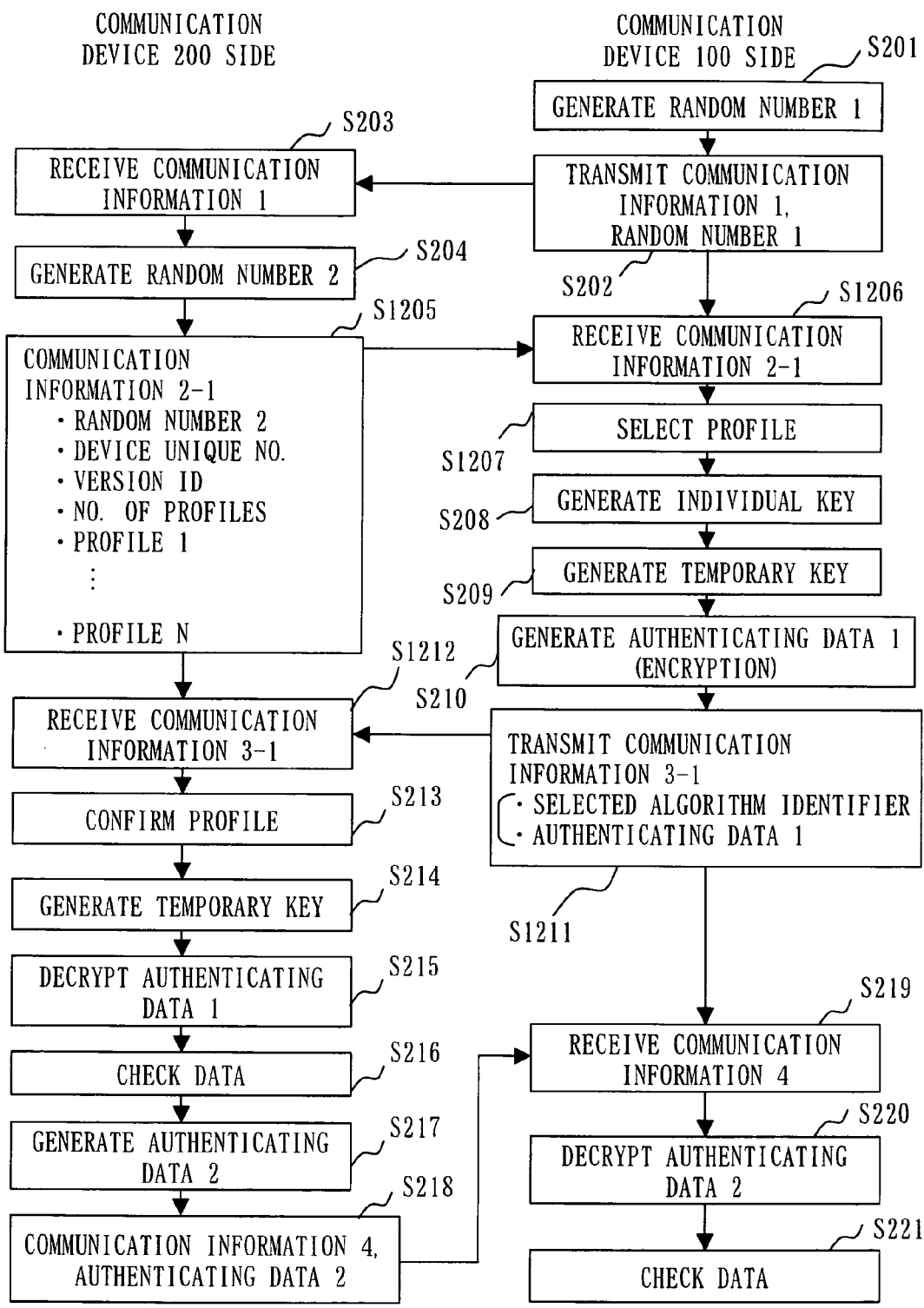
FIG. 12 is a flowchart describing an authenticating method according to a fourth embodiment.

FIG. 12 is a flowchart describing the authenticating method according to the fourth embodiment.

FIG. 12 is similar to FIG. 2 except that S205, S206, S207, S211 and S212 of FIG. 2 are replaced with S1205. S1206, S1207, S1211 and S1212.

In the fourth embodiment, the memory unit 220 further stores a version identifier (ID) to identify a version indicating a set in a manner that one set is formed from at least one algorithm corresponding to at least one algorithm identifier stored.

The memory unit 120 in turn, further stores a version identifier (ID) to identify a version of a set in such a manner that one set is formed from at least one algorithm corresponding to at least one algorithm identifier stored.

For example, a version identified by a version 1 as a version identifier supports only DES as an algorithm. A version identified by a version 2 supports DES and MISTY as algorithms. A version identified by a version 3 supports DES, MISTY, Camellia and AES as algorithms.

In S1205 as a transmitting step (a first transmitting step), the transmitting unit 212 transmits as communication information 2-1, at least one algorithm identifier, at least one encryption key identifier and the device unique number stored by the memory unit 220, the random number 2 generated by the random number generating unit 250, and further, the version identifier stored by the memory unit 220, to the communication device 100 as the authenticating device.

In S1206 as a receiving step (a first receiving step), the receiving unit 111 receives, from the communication device 200 as the authenticated device, the communication information 2-1 containing the random number 2, the device unique number, number of the profiles which is the same number as the sets of one algorithm identifier and one encryption key identifier, at least one profile identifier of the same number as the number of the profiles, at least one algorithm identifier and at least one encryption key identifier corresponding to each of the profiles of at least one profile identifier, and a prescribed version identifier.

In S1207 as a selecting step, when at least one algorithm stored by the memory unit 120 exists in the set indicated by a version identified by the prescribed version identifier received by the receiving unit 111, the selecting unit 160 selects a prescribed algorithm identifier corresponding to an algorithm to be stored by the memory unit 120 from the set indicated by the version identified by the prescribed version identifier received by the receiving unit 111. When the communication device 200 supports only an old version and all the algorithms indicated by the old version have security problems, for example, it is possible to terminate the rest of the authentication process without selecting any algorithms. On the other hand, when at least one algorithm usable for the authentication process exists, it is possible to perform the rest of the authentication process by using a usable algorithm. By using the version identifier, it is possible to detect from the version identifier whether a usable algorithm is installed on the communication device 200.

In S1211 as a transmitting step (a second transmitting step), the transmitting unit 112 transmits, as communication information 3-1, the prescribed algorithm identifier selected by the selecting unit 160 and the authenticating data 1 generated by the authenticating data 1 generating unit 190, to the communication device 200 as the authenticated device.

In S1212 as a receiving step, the receiving unit 211 receives, as the communication information 3-1, the prescribed algorithm identifier corresponding to the prescribed algorithm selected from among at least one algorithm stored by the memory unit 220, which forms the set indicated by the version identified by the version identifier, and the authenticating data 1 transmitted by the transmitting unit 212 from the communication device 100 as the authenticating device.

The authentication processing unit 296 thereafter generates the encryption key for authentication process by using the prescribe algorithm corresponding to the prescribed algorithm identifier received by the receiving unit 211, and the prescribed encryption key corresponding to the prescribed encryption key identifier paired with the prescribed algorithm identifier, and performs the authentication process with the authenticating device by using the generated encryption key for the authentication process.

The authentication processing unit 196 similarly generates the encryption key for authentication process by using the algorithm corresponding to the prescribed algorithm identifier transmitted by the transmitting unit 112, and the encryption key corresponding to the prescribed encryption key identifier paired with the prescribed algorithm identifier, and performs the authentication process with the authenticated device by using the generated encryption key for authentication process.

In addition to the effect according to the first embodiment, it is also possible to eliminate an old version having security problems by the configuration as stated above.

In the fourth embodiment, the selecting unit 160 selects the prescribed algorithm identifier, however, it is also possible that the selecting unit 160 further selects the prescribed encryption key identifier corresponding to the selected prescribed algorithm identifier. In such a case, there is no need to replace S211 and S212 in FIG. 2 with S1211 and S1212 in FIG. 12.

Embodiment 5

Each part of the configuration according to the fifth embodiment is similar to that in FIG. 1.

Figure 13:
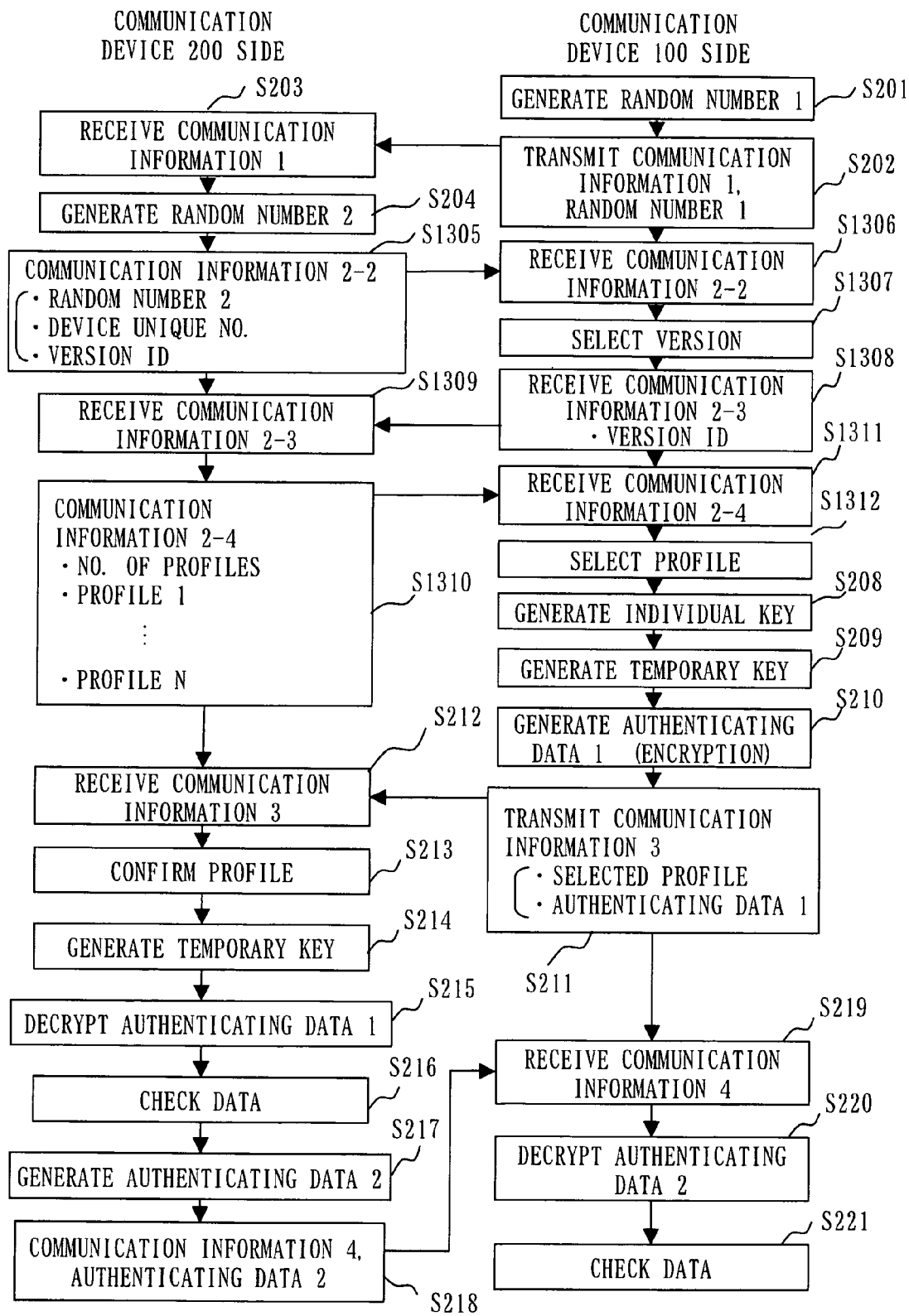
FIG. 13 is a flowchart describing an authenticating method according to a fifth embodiment.

FIG. 13 is a flowchart describing the authenticating method according to the fifth embodiment.

FIG. 13 is similar to FIG. 2 except that S205, S206 and S207 in FIG. 2 are replaced with S1305, S1306, S1307, S1308, S1309, S1310, S1311 and S1307 in FIG. 13.

In the fifth embodiment, as in the fourth embodiment, the memory unit 220 further stores a version identifier (ID) to identify a version indicating a set in such a manner that one set is formed by at least one algorithm corresponding to at least one algorithm identifier stored.

Similarly, the memory unit 120 further stores a version identifier (ID) to identify a version of a set in such a manner that one set is formed by at least one algorithm corresponding to at least one algorithm identifier stored.

In S1305 as a transmitting step, the transmitting unit 212 transmits as communication information 2-2, the device unique number stored by the memory unit 220, the random number 2 generated by the random number generating unit 250, and further, the version identifier stored by the memory unit 220, to the communication device 200 as the authenticating device.

In S1306 as a receiving step (a first receiving step), the receiving unit 111 receives the communication information 2-2 containing the random number 2, the device unique number and the prescribed version identifier from the communication device 200 as the authenticated device.

In S1307 as a selecting step, when the prescribed version identifier received by the receiving unit 111 coincides with the version identifier stored by the memory unit 120, the selecting unit 160 selects the version identifier. When the prescribed version identifier received by the receiving unit 111 does not coincide with the version identifier stored by the memory unit 120 but at least one algorithm stored by the memory unit 120 exists in the set indicated by the prescribed version identifier, the selecting unit 160 selects a version identifier of a version indicating a set wherein at least one algorithm stored by the memory unit 120 exists. For example, when the version identifier stored by the memory unit 120 is a version identifier of a later version than the prescribed version identifier received by the receiving unit 111, the prescribed version identifier received by the receiving unit 111, which is of an old version, is selected so that the versions are common to both the communication devices 100 and 200. By selecting the old version common to the communication devices 100 and 200, the rest of the authentication process can be continued and the key sharing can be executed.

In S1308 as a transmitting step, the transmitting unit 112 transmits the version identifier (ID) selected by the selecting unit 160 as communication information 2-3 to the communication device 200.

In S1309 as a receiving step, the receiving unit 211 receives the version identifier as the communication information 2-3 from the communication device 100.

In 1310 as a transmitting step, the transmitting unit 212 transmits, as communication information 2-4, at least one profile identifier stored by the memory unit 220, the algorithm identifiers and the encryption key identifiers paired as profiles identified by each of the profile identifiers, and the number of the profiles which is the same number as the sets of one algorithm identifier and one encryption key identifier, to the communication device 200 as the authenticating device.

In S1311 as a receiving step, the receiving unit 111 receives, as the communication information 2-4, at least one profile identifier, the algorithm identifiers and the encryption key identifiers paired as profiles identified by each of the profile identifiers, and the number of the profiles which is the same number as the sets of one algorithm identifier and one encryption key identifier, from the communication device 200 as the authenticated device. The random number 2 and the device unique number are contained in the communication information 2-2, however they can be contained in the communication information 2-4 instead.

In S1312 as a selecting step, when at least one profile identifier stored by the memory unit 120 exists among at least one profile identifier received by the receiving unit 111, the selecting unit 160 selects a prescribed profile identifier to be stored by the memory unit 120 from among at least one profile identifier received by the receiving unit 111. By selecting the prescribed profile identifier, a prescribed algorithm identifier and a prescribed encryption key identifier paired as a profile identified by the prescribed profile identifier are selected.

As stated above, the fifth embodiment is an embodiment wherein the step of selecting a version is performed separately compared to the fourth embodiment. By the configuration as stated above, the effect similar to that in the fourth embodiment can be achieved. Further, in addition to the effect according to the first embodiment, it is also possible to eliminate algorithms having security problems.

As stated above, there is provided according to the above-mentioned embodiment an authenticating method including:

a first transmitting step to transmit, from an authenticated device storing a plurality of algorithm identifiers and a plurality of encryption key identifiers, to an authenticating device, the plurality of algorithm identifiers and the plurality of encryption key identifiers stored;

a first receiving step to receive the plurality of algorithm identifiers and the plurality of encryption key identifiers transmitted from the authenticated device by the first transmitting step, at the authenticating device storing at least one algorithm identifier and at least one encryption key identifier;

a selecting step to select, at the authenticating device, a prescribed algorithm identifier and a prescribed encryption key identifier to be stored by the authenticating device from among the plurality of algorithm identifiers and the plurality of encryption key identifiers received by the receiving step, when the at least one algorithm identifier and the at least one encryption key identifier stored by the authenticating device exist among the plurality of algorithm identifiers and the plurality of encryption key identifiers received by the first receiving step;

a second transmitting step to transmit the prescribed algorithm identifier and the prescribed encryption key identifier selected by the selecting step, from the authenticating device to the authenticated device;

a second receiving step to receive the prescribed algorithm identifier and the prescribed encryption key identifier transmitted by the second transmitting step, from the authenticating device, at the authenticated device; and an authentication processing step to perform an authentication process between the authenticating device and the authenticated device, based on the prescribed algorithm identifier and the prescribed encryption key identifier received by the second receiving step.

Alternatively, there is provided according to the above-mentioned embodiment an authenticating method including:

a first transmitting step to transmit, from an authenticated device storing at least one algorithm identifier and at least one encryption key identifier, to an authenticating device, the at least one algorithm identifier and the at least one encryption key identifier stored;

a first receiving step to receive the at least one algorithm identifier and the at least one encryption key identifier transmitted from the authenticated device by the first transmitting step, at the authenticating device storing a plurality of algorithm identifiers and a plurality of encryption key identifiers;

a selecting step to select, at the authenticating device, a prescribed algorithm identifier and a prescribed encryption key identifier to be stored by the authenticating device from among the at least one algorithm identifier and the at least one encryption key identifier received by the receiving step, when at least one of the plurality of algorithm identifiers and at least one of the plurality of encryption key identifiers stored by the authenticating device exist among the at least one algorithm identifier and the at least one encryption key identifier received by the first receiving step;

a second transmitting step to transmit the prescribed algorithm identifier and the prescribed encryption key identifier selected by the selecting step, from the authenticating device to the authenticated device;

a second receiving step to receive the prescribed algorithm identifier and the prescribed encryption key identifier transmitted by the second transmitting step, from the authenticating device, at the authenticated device; and an authentication processing step to perform an authentication process between the authenticating device and the authenticated device, based on the prescribed algorithm identifier and the prescribed encryption key identifier received by the second receiving step.

It is possible to allow parts or the whole of what are explained as "units" in the above explanations for each embodiment to be configured with programs operable on computers. Those programs can be written in C language, for example. Alternatively, HTML, SGML or XML may be used.

Figure 14:
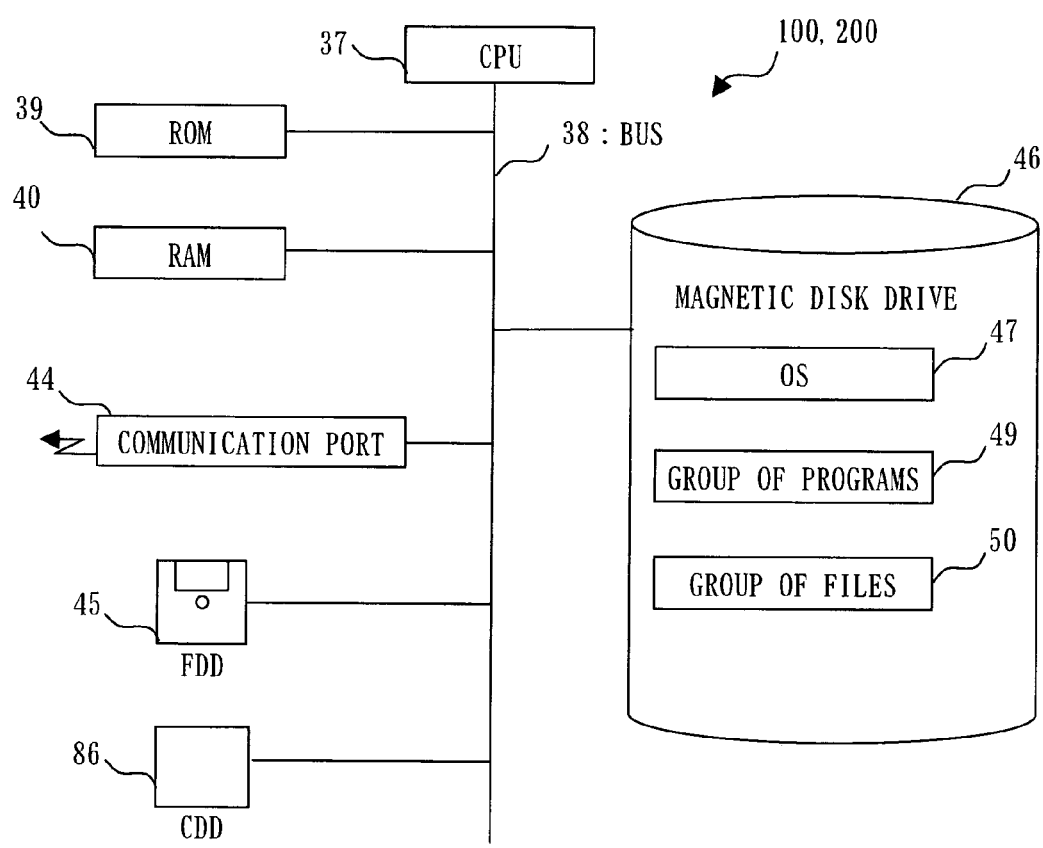
FIG. 14 is a hardware configuration diagram.

FIG. 14 is a hardware configuration diagram.

When programs operable on computers constitute parts or the whole of what are described in the above explanations for each embodiment as "units", the communication devices 100 and 200 are equipped with CPU 37 (Central Processing Unit 37) to execute programs, as described in FIG. 14. The CPU 37 incorporates, or connects to via a bus 38, RAM 40 (Random Access Memory 40) as one example of a memory device or a memory unit, and a communication port 44 capable of communicating with the outside. Further, it is also possible to configure the CPU 37 to be connected to the memory devices such as ROM 39 (Read Only Memory 39) and a magnetic disk drive 46 as described in FIG. 14.

When programs constitute parts or the whole of what are described as "units" in the above explanations for each embodiment, the group of programs 49 in FIG. 14 stores programs executed by what are described as "units" in the explanations for each embodiment. The group of programs 49 is stored in the memory devices. The group of programs 49 is executed by CPU 37, OS 47 etc. The memory devices store results of each process.

Further, such a configuration is also possible to implement what are described as "units" in the explanations for each embodiment, by firmware stored in ROM 39. Alternatively, such another configuration is also possible to implement what are described as "units" in the explanations for each embodiment by software, hardware or combination of software, hardware and firmware.

Further, such another configuration is also possible to store the programs to implement each embodiment by using recording apparatuses with the other recording media, such as a FD (Flexible Disk), an optical disk, a CD (Compact Disk), a MD (Mini Disk) or a DVD (Digital Versatile Disk). In such a case, a FDD 45 (Flexible Disk Drive 45), a compact disk drive 86 (CDD 86) and the like are provided in this configuration as shown in FIG. 14.

INDUSTRIAL APPLICABILITY

The communication device 100 and the communication device 200 as stated above can be used not only as a roadside device at a store side and an on-board device at a vehicle in ETC, drive-through etc., but also as an authenticating device and as an authenticated device, between mobile communication devices such as mobile telephones, wire communication devices, or a wire communication device and a wireless communication device via a based station and the like.

The present invention makes it possible to perform an authentication and key sharing even between devices implementing different algorithms, and to allow a system and a device to remain operable even when one algorithm is made unusable due to breaking of the algorithm or the like.

Further, the present invention makes it possible to reduce the risk of decrease in security due to breaking of the algorithm or the like.

Further, the present invention makes it possible to reduce chances of unauthorized decryption by eavesdropping or the like, and to improve the security.

The invention claimed is:

1. An authenticated device comprising:
a memory unit to store at least one algorithm identifier and at least one encryption key identifier;
a transmitting unit to transmit the at least one algorithm identifier and the at least one encryption key identifier stored by the memory unit to an authenticating device;
a receiving unit to receive from the authenticating device a prescribed algorithm identifier and a prescribed encryption key identifier, selected from among the at least one algorithm identifier and the at least one encryption key identifier transmitted by the transmitting unit; and
an authentication processing unit to perform an authentication process with the authenticating device, based on the prescribed algorithm identifier and the prescribed encryption key identifier received by the receiving unit.

2. The authenticated device of claim 1,
wherein the memory unit stores at least one algorithm identifier and at least one encryption key identifier in such a manner that one algorithm identifier and one encryption key identifier are paired as one profile;
wherein the transmitting unit transmits, to the authenticating device, the at least one algorithm identifier and the at least one encryption key identifier stored by the memory unit in such a manner that one algorithm identifier and one encryption key identifier are paired as one profile;
wherein the receiving unit receives, from the authenticating device, the prescribed algorithm identifier and the prescribed encryption key identifier paired as a prescribed profile, among the at least one algorithm identifier and the at least one encryption key identifier transmitted by the transmitting unit; and
wherein the authentication processing unit performs the authentication process with the authenticating device, based on the prescribed algorithm identifier and the prescribed encryption key identifier paired as the prescribed profile received by the receiving unit.

3. The authenticated device of claim 2,
wherein the memory unit further stores a version identifier to identify a version indicating a set in such a manner that one set is formed from at least one algorithm corresponding to the at least one algorithm identifier stored;
wherein the transmitting unit transmits the version identifier stored by the memory unit to the authenticating device;
wherein the receiving unit receives, from the authenticating device, the prescribed algorithm identifier corresponding to a prescribed algorithm among the at least one algorithm forming the set indicated by the version identified by the version identifier transmitted from the transmitting unit; and
wherein the authentication processing unit performs the authentication process with the authenticating device, based on the prescribed algorithm identifier received by the receiving unit and on a prescribed encryption key identifier paired with the prescribed algorithm identifier.

4. An authenticating device comprising:
a memory unit to store at least one algorithm identifier and at least one encryption key identifier;
a receiving unit to receive at least one algorithm identifier and at least one encryption key identifier from an authenticated device;
a selecting unit to select a prescribed algorithm identifier and a prescribed encryption key identifier to be stored by the memory unit from among the at least one algorithm identifier and the at least one encryption key identifier received by the receiving unit, when the at least one algorithm identifier and the at least one encryption key identifier stored by the memory unit exist among the at least one algorithm identifier and the at least one encryption key identifier received by the receiving unit;
a transmitting unit to transmit the prescribed algorithm identifier and the prescribed encryption key identifier selected by the selecting unit to the authenticated device; and
an authentication processing unit to perform an authentication process with the authenticated device, based on the prescribed algorithm identifier and the prescribed encryption key identifier transmitted by the transmitting unit.

5. The authenticating device of claim 4,
wherein the memory unit stores at least one profile identifier to identify at least one profile, whereby one algorithm identifier among the at least one algorithm identifier and one encryption key identifier among the at least one encryption key identifier are paired;
wherein the receiving unit further receives at least one profile identifier from the authenticated device;

wherein the selecting unit selects a prescribed profile identifier to be stored by the memory unit from among the at least one profile identifier received by the receiving unit, when the at least one profile identifier stored by the memory unit exists among the at least one profile identifier received by the receiving unit;

wherein the transmitting unit transmits the prescribed profile identifier selected by the selecting unit to the authenticated device; and wherein the authentication processing unit performs the authentication process with the authenticated device, based on the prescribed algorithm identifier and the prescribed encryption key identifier paired by a prescribed profile identified by the prescribed profile identifier transmitted by the transmitting unit.

6. The authenticating device of claim 5, wherein the memory unit further stores a version identifier to identify a version of a set in such a manner that one set is formed from at least one algorithm corresponding to the at least one algorithm identifier stored;

wherein the receiving unit further receives a prescribed version identifier from the authenticated device;

wherein the selecting unit selects the prescribed algorithm identifier corresponding to one algorithm in the set indicated by the version identified by the prescribed version identifier received by the receiving unit;

wherein the transmitting unit transmits the prescribed algorithm identifier selected by the selecting unit to the authenticated device; and wherein the authentication processing unit performs the authentication process with the authenticated device, based on the prescribed algorithm identifier transmitted by the transmitting unit and on a prescribed encryption key identifier paired with the prescribed algorithm identifier.

7. An authenticating method comprising:

a first transmitting step to transmit, from an authenticated device storing a plurality of algorithm identifiers and a plurality of encryption key identifiers, to an authenticating device, the plurality of algorithm identifiers and the plurality of encryption key identifiers stored;

a first receiving step to receive the plurality of algorithm identifiers and the plurality of encryption key identifiers transmitted from the authenticated device by the first transmitting step, at the authenticating device storing at least one algorithm identifier and at least one encryption key identifier;

a selecting step to select, at the authenticating device, a prescribed algorithm identifier and a prescribed encryption key identifier to be stored by the authenticating device from among the plurality of algorithm identifiers and the plurality of encryption key identifiers received by the receiving step, when the at least one algorithm identifier and the at least one encryption key identifier stored by the authenticating device exist among the plurality of algorithm identifiers and the plurality of encryption key identifiers received by the first receiving step;

a second transmitting step to transmit the prescribed algorithm identifier and the prescribed encryption key identifier selected by the selecting step, from the authenticating device to the authenticated device;

a second receiving step to receive the prescribed algorithm identifier and the prescribed encryption key identifier transmitted by the second transmitting step, from the authenticating device, at the authenticated device; and an authentication processing step to perform an authentication process between the authenticating device and the authenticated device, based on the prescribed algorithm identifier and the prescribed encryption key identifier received by the second receiving step.

8. An authenticating method comprising:

a first transmitting step to transmit, from an authenticated device storing at least one algorithm identifier and at least one encryption key identifier, to an authenticating device, the at least one algorithm identifier and the at least one encryption key identifier stored;

a first receiving step to receive the at least one algorithm identifier and the at least one encryption key identifier transmitted from the authenticated device by the first transmitting step, at the authenticating device storing a plurality of algorithm identifiers and a plurality of encryption key identifiers;

a selecting step to select, at the authenticating device, a prescribed algorithm identifier and a prescribed encryption key identifier to be stored by the authenticating device from among the at least one algorithm identifier and the at least one encryption key identifier received by the receiving step, when at least one of the plurality of algorithm identifiers and at least one of the plurality of encryption key identifiers stored by the authenticating device exist among the at least one algorithm identifier and the at least one encryption key identifier received by the first receiving step;

a second transmitting step to transmit the prescribed algorithm identifier and the prescribed encryption key identifier selected by the selecting step, from the authenticating device to the authenticated device;

a second receiving step to receive the prescribed algorithm identifier and the prescribed encryption key identifier transmitted by the second transmitting step, from the authenticating device, at the authenticated device; and an authentication processing step to perform an authentication process between the authenticating device and the authenticated device, based on the prescribed algorithm identifier and the prescribed encryption key identifier received by the second receiving step.

9. An authenticating method comprising:

transmitting, from an authenticated device storing a plurality of algorithm identifiers and a plurality of encryption key identifiers, to an authenticating device, the plurality of algorithm identifiers and the plurality of encryption key identifiers stored;

receiving the plurality of algorithm identifiers and the plurality of encryption key identifiers transmitted from the authenticated device, at the authenticating device storing at least one algorithm identifier and at least one encryption key identifier;

selecting, at the authenticating device, a prescribed algorithm identifier and a prescribed encryption key identifier to be stored by the authenticating device from among the plurality of algorithm identifiers and the plurality of encryption key identifiers received, when the at least one algorithm identifier and the at least one encryption key identifier stored by the authenticating device exist among the plurality of algorithm identifiers and the plurality of encryption key identifiers received;

transmitting the prescribed algorithm identifier and the prescribed encryption key identifier selected, from the authenticating device to the authenticated device;

receiving the prescribed algorithm identifier and the prescribed encryption key identifier transmitted from the authenticating device, at the authenticated device; and performing an authentication process between the authenticating device and the authenticated device, based on the prescribed algorithm identifier and the prescribed encryption key identifier received.

10. An authenticating method comprising:

transmitting, from an authenticated device storing at least one algorithm identifier and at least one encryption key identifier, to an authenticating device, the at least one algorithm identifier and the at least one encryption key identifier stored;

receiving the at least one algorithm identifier and the at least one encryption key identifier transmitted from the authenticated device, at the authenticating device storing a plurality of algorithm identifiers and a plurality of encryption key identifiers;

selecting, at the authenticating device, a prescribed algorithm identifier and a prescribed encryption key identifier to be stored by the authenticating device from among the at least one algorithm identifier and the at least one encryption key identifier received, when at least one of the plurality of algorithm identifiers and at least one of the plurality of encryption key identifiers stored by the authenticating device exist among the at least one algorithm identifier and the at least one encryption key identifier received;

transmitting the prescribed algorithm identifier and the prescribed encryption key identifier selected, from the authenticating device to the authenticated device;

receiving the prescribed algorithm identifier and the prescribed encryption key identifier transmitted from the authenticating device, at the authenticated device; and performing an authentication process between the authenticating device and the authenticated device, based on the prescribed algorithm identifier and the prescribed encryption key identifier received.

* * * * *